(12) United States Patent
Myoung

(10) Patent No.: US 11,301,001 B2
(45) Date of Patent: Apr. 12, 2022

(54) ROLLABLE DISPLAY APPARATUS

(71) Applicant: LG Display Co., Ltd., Seoul (KR)

(72) Inventor: NhoHoon Myoung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/571,039

(22) Filed: Sep. 13, 2019

(65) Prior Publication Data

US 2020/0097047 A1    Mar. 26, 2020

(30) Foreign Application Priority Data

Sep. 21, 2018   (KR) ........................ 10-2018-0113687

(51) Int. Cl.
```
G06F 1/16       (2006.01)
G06F 3/147      (2006.01)
G09F 9/30       (2006.01)
H01B 1/04       (2006.01)
H01B 1/12       (2006.01)
```
(52) U.S. Cl.
CPC ............ *G06F 1/1652* (2013.01); *G06F 3/147* (2013.01); *G09F 9/301* (2013.01); *H01B 1/04* (2013.01); *H01B 1/124* (2013.01)

(58) Field of Classification Search
None
See application file for complete search history.

(56) References Cited

U.S. PATENT DOCUMENTS

| | | | |
|---|---|---|---|
| 9,860,353 B2 | 1/2018 | Lee et al. | |
| 9,992,881 B2 | 6/2018 | Choi et al. | |
| 10,126,778 B2 | 11/2018 | Yang | |
| 10,321,584 B2 | 6/2019 | Choi et al. | |
| 10,863,633 B2 | 12/2020 | Choi et al. | |
| 2005/0136244 A1* | 6/2005 | Schmitz | B32B 27/08 428/323 |
| 2011/0151252 A1 | 6/2011 | Shintani et al. | |
| 2014/0146163 A1* | 5/2014 | Woo | G01N 21/8901 348/88 |

(Continued)

FOREIGN PATENT DOCUMENTS

| | | |
|---|---|---|
| CN | 102131878 A | 7/2011 |
| CN | 105518767 A | 4/2016 |

(Continued)

OTHER PUBLICATIONS

China National Intellectual Property Administration, Office Action, CN Patent Application No. 201910884127.7, dated Mar. 22, 2021, 25 pages.

*Primary Examiner* — Amr A Awad
*Assistant Examiner* — Donna V Bocar
(74) *Attorney, Agent, or Firm* — Fenwick & West LLP

(57) ABSTRACT

A rollable display apparatus including a display panel having a threshold curvature radius; a roller, having a curvature radius equal to or larger than the threshold curvature radius, attached to one side of the display panel and configured to allow the display panel to be rolled-up; and a curved surface member, spaced apart from the roller, having a curvature radius equal to or larger than the threshold curvature radius in an area in contact with the display panel, configured to bend the display panel in a direction opposite to a direction in which the display panel is rolled by the roller.

6 Claims, 8 Drawing Sheets

(56) References Cited

U.S. PATENT DOCUMENTS

| | | | |
|---|---|---|---|
| 2015/0064340 A1* | 3/2015 | Curran | B05D 3/142 |
| | | | 427/8 |
| 2016/0019019 A1* | 1/2016 | Ikeda | G06F 3/0412 |
| | | | 345/173 |
| 2016/0120022 A1 | 4/2016 | Lee et al. | |
| 2016/0165717 A1* | 6/2016 | Lee | G09F 9/301 |
| | | | 361/749 |
| 2016/0209879 A1* | 7/2016 | Ryu | G06F 1/1601 |
| 2017/0318688 A1* | 11/2017 | Kim | G06F 1/1652 |
| 2017/0332496 A1 | 11/2017 | Choi et al. | |
| 2017/0357287 A1 | 12/2017 | Yang | |
| 2018/0014415 A1 | 1/2018 | Choi et al. | |
| 2018/0098440 A1 | 4/2018 | Choi et al. | |
| 2018/0107306 A1 | 4/2018 | Hong et al. | |
| 2018/0341142 A1* | 11/2018 | Choi | G06F 1/1643 |
| 2018/0351117 A1* | 12/2018 | Kim | H01L 51/5253 |
| 2019/0254180 A1 | 8/2019 | Choi et al. | |
| 2019/0261519 A1* | 8/2019 | Park | G02F 1/133305 |
| 2019/0296089 A1* | 9/2019 | Isa | G06F 3/041 |
| 2020/0033913 A1* | 1/2020 | Yang | G06F 1/1624 |

FOREIGN PATENT DOCUMENTS

| | | |
|---|---|---|
| CN | 105609523 A | 5/2016 |
| CN | 106992263 A | 7/2017 |
| CN | 107369383 A | 11/2017 |
| CN | 107895541 A | 4/2018 |

* cited by examiner

ROLLABLE DISPLAY APPARATUS

CROSS-REFERENCE TO RELATED APPLICATIONS

This application claims the priority of Republic of Korean Patent Application No. 10-2018-0113687 filed on Sep. 21, 2018, in the Korean Intellectual Property Office, the disclosure of which is incorporated by reference in its entirety.

TECHNICAL FIELD

The present disclosure relates to a rollable display apparatus, and more particularly to a rollable display apparatus with improved reliability.

BACKGROUND

A display apparatus can receive an image signal and display an image. A flexible display apparatus refers to a display apparatus having flexible characteristics. The flexible display apparatus may be a curved display apparatus that is bent to a specific shape, a foldable display apparatus that can be folded to specific axes, and a rollable display apparatus that can be curled to a specific radius of curvature.

The display apparatus can be implemented with an electroluminescence element such as a micro light emitting diode (Micro LED), an organic light emitting diode (OLED), a quantum-dot light emitting diode (QLED), and the like.

Among the flexible display apparatus, the rollable display apparatus generally stores a flexible display panel in the housing. When the rollable display apparatus is stored while being rolled into the housing, excessive stress, cracks, or stamping may occur in a part of the display panel of the rollable display apparatus, resulting in defects or reliability problems.

SUMMARY

Disclosed are various structures capable of restoring the deformation of the display panel of the rollable display apparatus to be stored by being rolled-up and not applying excessive stress to the display panel.

For example, a curvature radius of the contact area of the display panel corresponding to the structures for restoring the deformation of the display panel affects the reliability of the display panel. Thus, the disclosed embodiments take into consideration the radius of curvature of structures contacting the display panel.

Moreover, friction may occur due to contact between the display panel and structures for restoring deformation of the display panel, and static electricity may be generated on the display panel. Further, undesired foreign matter may adhere to the surface of the display panel due to static electricity, so that when the display panel is rolled-up, damage to the display panel may occur due to foreign matter.

Accordingly, an object of the present disclosure is to provide a rollable display apparatus in which the above-mentioned problems are improved.

Accordingly, an object of the present disclosure is to provide a rollable display apparatus with improved reliability of display panel of the rollable display apparatus.

Accordingly, an object of the present disclosure is to provide a rollable display apparatus comprising a structure that can restore the deformation of the display panel and guide the display panel not being bent below the threshold curvature radius.

Accordingly, an object of the present disclosure is to provide a rollable display apparatus that can restore the deformation of the display panel of the rollable display apparatus and can reduce the generation of static electricity.

The objects of the present disclosure are not limited to the above-mentioned objects, and the other objects of the present disclosure can be clearly understood by those skilled in the art from the following description.

According to the embodiments of the present disclosure, a rollable display apparatus may include a display panel having a threshold curvature radius; a roller, having a curvature radius equal to or larger than the threshold curvature radius, attached to one side of the display panel and configured to allow the display panel to be rolled-up in a first direction; and a curved surface member, spaced apart from the roller, having a curvature radius equal to or larger than the threshold curvature radius in an area in contact with the display panel, configured to bend the display panel in a second direction opposite to the first direction in which the display panel is rolled by the roller. The display panel is configured to be rolled with a curvature equal to or larger than the threshold curvature radius without being damaged.

The roller may be electrically grounded and configured to discharge static electricity of the display panel.

The curved surface member may be electrically grounded and configured to discharge static electricity generated on the display panel.

A surface of at least one of the roller, the curved surface member, and the display panel may have a sheet resistance capable of reducing static electricity.

At least one among the roller, the curved surface member, and the display panel may comprise at least one material among a conductive carbon material, a nanometal, and a conductive polymer.

The sheet resistance at a surface of the display panel may be 1012 Ω/sq or less. The sheet resistance at a surface of the roller may be 1012 Ω/sq or less. The sheet resistance at a surface of the curved surface member may be 1012 Ω/sq or less.

The nanometal may comprise at least one of indium-tin-oxide (ITO), antimony-tin-oxide (ATO), and silver (Ag).

The conductive polymer may comprise at least one material among polyaniline, polypyrrole, and polythiophene.

The rollable display apparatus may include a housing configured to contain the display panel, the roller, and the curved surface member, and the roller may be electrically grounded to the housing.

The rollable display apparatus may include a housing configured to contain the display panel, the roller, and the curved surface member, and the curved surface member may be electrically grounded to the housing.

The rollable display apparatus may include a housing configured to contain the display panel, the roller, and the curved surface member, and the housing may include an opening area allowing the display panel to be exposed outside the housing.

A curvature radius of an edge of the opening area may be equal to or larger than the threshold curvature radius of the display panel.

The rollable display apparatus may include a handle adjacent to the opening area. The handle is connected to an end of the display panel.

The display panel of the rollable display panel may further include a first surface and a second surface opposite to the first surface. The first surface of the display panel is in contact with a surface of the roller. The second surface of the display panel is in contact with a surface of the curved surface member.

According to the embodiments of the present disclosure, a rollable display apparatus may include a display panel configured to have a threshold curvature radius; a first roller, configured to roll-up the display panel, and having a curvature radius equal to or larger than the threshold curvature radius; and a second roller, configured to restore deformation of the display panel caused by the first roller, and having a curvature radius equal to or larger than the threshold curvature radius. The display panel is configured to be rolled with a curvature equal to or larger than the threshold curvature radius without being damaged.

The rollable display apparatus may include a housing for containing the display panel, the first roller, and the second roller. An opening area of the housing may be configured to have a curvature radius equal to or larger than a threshold curvature radius of the display panel.

A sheet resistance of a surface of at least one of the first roller, the second roller, and the housing may be less than or equal to a specific value so as to reduce a static electricity generated by friction of at least one of the first roller, the second roller, and the housing in contact with the display panel.

The display panel may be electrically grounded.

The display panel of the rollable display panel may further include a first surface and a second surface opposite to the first surface. The first surface of the display panel is in contact with a surface of the roller. The second surface of the display panel is in contact with a surface of the curved surface member.

The second roller of the rollable display apparatus may be configured to move between a first position and a second position. The second roller may be configured to be in contact with the display panel when the second roller is in the first position. The second roller may be configured to not be in contact with the display panel when the second roller is in the second position.

According to the embodiments of the present disclosure, a rollable display apparatus may include a first roller designed in consideration of a threshold curvature radius of a display panel and in consideration of deformation according to winding and unwinding operation of the display panel, and a curved surface member designed in consideration of the threshold curvature radius of the display panel and in consideration of deformation according to the winding and unwinding operation of the display panel.

The curved surface member may be roller-shaped.

According to yet another aspect of the present disclosure, a rollable display apparatus according to the embodiments of the present disclosure may include a display panel having a threshold curvature radius; a first roller, configured to roll-up the display panel, and having a curvature radius equal to or larger than the threshold curvature radius; a second roller, configured to adjust a tensile force applied to the display panel by the change of the position thereof, the second roller having a curvature radius equal to or larger than the threshold curvature radius; and a third roller, configured to restore deformation of the display panel caused by the first roller, the third roller having a curvature radius equal to or larger than the threshold curvature radius. The display panel is configured to be rolled with a curvature equal to or larger than the threshold curvature radius without being damaged.

The second roller of the rollable display apparatus may be configured to move between a first position and a second position. The second roller may be configured to be in contact with the display panel when the second roller is in the first position. The second roller may be configured to not be in contact with the display panel when the second roller is in the second position.

Some particular elements of the present disclosure that can solve particular problems, for example, damage caused by foreign objects, static electricity, and extra when a display panel is rolled-up can be selectively implemented as needed for to solve particular problems.

The rollable display apparatus according to the embodiments of the present disclosure has an effect of reducing the likelihood of damage to the display panel even when the display panel is repeatedly rolled and unrolled, thereby improving reliability.

The rollable display apparatus according to the embodiments of the present disclosure has an effect that the reliability of the display panel can be improved by providing a structure capable of restoring deformation of the display panel while suppressing the display panel from bending below a threshold curvature radius.

The rollable display apparatus according to the embodiments of the present disclosure has an effect of improving the reliability of the display panel by providing a structure capable of reducing the generation of static electricity while restoring the deformation of the display panel.

The effects according to the present disclosure are not limited by the contents exemplified above, and more various effects are included in the present disclosure.

DETAILED DESCRIPTION OF THE PREFERRED EMBODIMENTS

Figure 1:
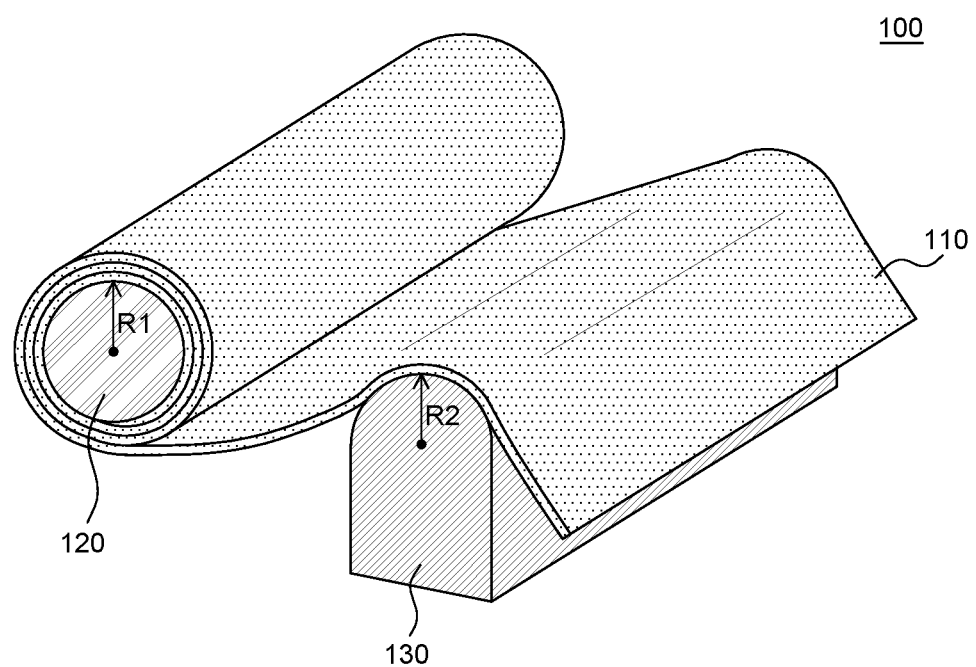
FIG. 1 is a perspective view schematically showing a rollable display apparatus according to an embodiment of the present disclosure.

Advantages and characteristics of the present disclosure and a method of achieving the advantages and characteristics will be clear by referring to the embodiments described below in detail together with the accompanying drawings. However, the present disclosure is not limited to the embodiment disclosed herein but will be implemented in various forms. The embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the various embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range (e.g., a tolerance range) even if not expressly stated.

When the position relation between two elements is described using the terms such as "on", "above", "below", and "next", one or more elements may be positioned between the two portions unless the terms are used with the term "immediately" or "directly".

When an element or a layer is "on" another element or another layer, it may be interpreted as such the other layer or the other element can be interposed on or in the middle of another element.

Although the terms "first," "second," and the like are used for describing various components, these components are not confined by these terms. These terms are used for distinguishing one component from the other components. Therefore, a first component to be mentioned below may be a second component in a technical concept of the present disclosure.

Like reference numerals refer to like elements throughout the specification.

Size and thickness of each element shown in the figures are for illustrative purpose for convenience of description, but are not necessarily limited to the size and thickness of the configuration of the present disclosure as illustrated.

Each of the features of the various embodiments of the present disclosure can be combined or combined with each other partly or entirely. The features of the various embodiments can be technically interlocked and driven as well. The features of the various embodiments can be practiced independently or in conjunction with each other.

Hereinafter, various embodiments of the present disclosure will be described in detail with reference to accompanying drawings.

Figure 2:
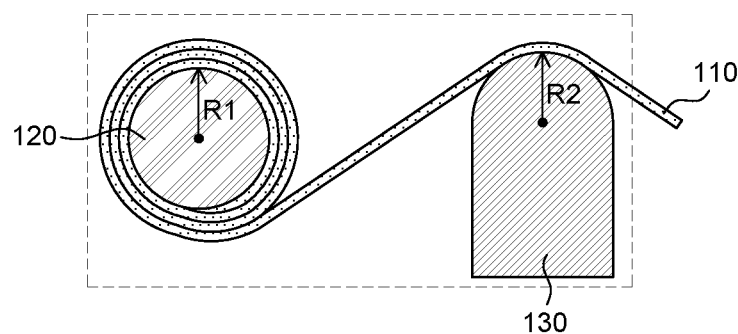
FIG. 2 is a cross-sectional view schematically showing a rollable display apparatus according to an embodiment of the present disclosure.

FIG. 1 is a perspective view schematically showing a rollable display apparatus according to an embodiment of the present disclosure. FIG. 2 is a cross-sectional view schematically showing a rollable display apparatus according to an embodiment of the present disclosure.

The display panel 110 is configured to display an image. The display panel 110 can display an image using a plurality of pixels. A plurality of pixels can be formed on a flexible substrate. The plurality of pixels may include a light emitting element and at least one thin film transistor for driving the light emitting element. The thin film transistor may be formed by selectively forming an insulating film, a metal wiring, a semiconductor material, or the like on a substrate of the display panel 110.

An area where a plurality of pixels of the display panel 110 are arranged can be defined as a display area. The non-display area may be defined as an area other than the display area or a periphery area of the display area and a driving unit for driving the plurality of pixels may be disposed in the non-display area. The driving unit may include a gate driver for supplying a scan signal and a data driver for supplying a video signal, but the present disclosure is not limited thereto.

The light emitting element may be an electroluminescence element. The electroluminescence element may include a first electrode, an electroluminescence layer on the first electrode, and a second electrode on the electroluminescence layer. When the electroluminescence layer is formed of an organic luminescent layer, the electroluminescence element may be referred to as an organic light emitting diode (OLED). When the electroluminescence layer is formed of an inorganic luminescent layer, the electroluminescence element may be referred to as an inorganic light emitting diode or a quantum dot diode (QLED). However, the present disclosure is not limited thereto.

The first electrode may be an anode or a cathode. The second electrode may be a cathode when the first electrode is an anode, and may be an anode when the first electrode is a cathode.

The display panel 110 may be a top emission type, a bottom emission type, or a dual side emission type, depending on the structure of the light emitting element. Also, the display panel 110 may be a transparent display panel capable of transmitting the background. However, the present disclosure is not limited thereto.

The display panel 110 may include a first surface and a second surface opposite to the first surface. The display panel 110 may be rolled-up and being stored by the first roller 120. The display panel 110 may be rolled-up by the first roller 120 and can be unrolled.

The display panel 110 is configured to have a certain threshold curvature radius RTH value. The threshold curvature radius RTH is a value indicating the limit of the flexible characteristic of the display panel 110. According to an embodiment of the present disclosure, a range of the threshold curvature radius RTH is 3R to 500R.

When the display panel 110 is folded or curled smaller than the threshold curvature radius RTH, excessive stress or damage may occur to the display panel 110. When a specific area of the display panel 110 is curled smaller than a threshold curvature radius RTH, a crack may be generated in a substrate, an insulating layer, an electric wiring, or the like included in the display panel 110.

The rollable display apparatus according to embodiments of the present disclosure is characterized in that the display panel is designed not to curl below the threshold curvature radius RTH of the display panel.

One side of the display panel 110 of the rollable display apparatus 100 according to an embodiment of the present disclosure, is fixed to the first roller 120. The display panel 110 is configured to be rolled-up by the first roller 120. If the curvature radius R1 of the first roller 120 is less than the threshold curvature radius RTH of the display panel 110, the insulation layer or wiring of the flexible display panel 110 may be damaged.

When the display panel 110 is stored by being rolled-up in one direction, the display panel 110 may receive sustained stress in one direction. Therefore, the display panel 110 may be deformed along with the rolled-up direction, and the flatness of the display panel 110 may be degraded.

The first roller 120 is connected to one side of the display panel 110. The curvature radius of the first roller 120, that is, the first curvature radius R1, is configured to have a value equal to or larger than a threshold curvature radius RTH of the display panel 110. According to said configuration, even if the display panel 110 is rolled-up and stored by the first roller 120 having the first curvature radius R1, since the display panel 110 is curled above the threshold curvature radius RTH of the display panel 110, there is an effect that the stress applied to the display panel 110 can be reduced. In addition, since the stress below the threshold level is applied to the display panel 110, the likelihood of damage can be reduced even if the display panel 110 is rolled-up.

The first roller 120 is configured to contact the first surface of the display panel 110 when the display panel 110 is rolled-up. The first roller 120 may be physically fastened or bonded to one end of the display panel 110.

The first roller 120 may be configured to be rotated by mechanical or electrical actuation. Corresponding to the rotation of the first roller 120, the display panel 110 can be rolled or unrolled.

For example, the first roller 120 may be rotated by various elements that can rotate the first roller 120, such as a motor, a spring, a gear, a handle, and the like. But the present disclosure is not limited thereto.

The first roller 120 can provide a space therein in which a circuit element or a mechanical element may be embedded, thereby an image signal can be supplied to the display panel 110 by a circuit element or a mechanical element embedded in the first roller 120. Further, a circuit element or a mechanical element for controlling the rotation of the first roller 120 can be included. But the present disclosure is not limited thereto and it is also possible to arrange a circuit element or a mechanical element outside the first roller 120 to supply an image signal to the display panel 110 or to control the rotation of the first roller 120. But the present disclosure is not limited thereto.

The first roller 120 can be rotated by an external force or a pulling force applied to the other end of the display panel 110. For example, when a user pulls out by hand the other end of the display panel 110 which is rolled-up, the first roller 120 can be rotated by the pulling force. But the present disclosure is not limited thereto.

The curved surface member 130 is configured to contact the second surface which is the opposite surface of the first surface of the display panel 110.

The curvature radius of the curved surface member 130, that is, the second curvature radius R2, is configured to have a value equal to or larger than the threshold curvature radius RTH of the display panel 110. According to said configuration, even if the display panel 110 is brought into contact with the curved surface member 130 having the second curvature radius R2, since the display panel 110 is bent only at or above the threshold curvature radius RTH of the display panel 110, thus, it is possible to reduce the stress applied to the display panel 110. Further, since the stress less than the threshold curvature radius is applied to the display panel 110, the likelihood of damage can be reduced even if the display panel 110 is curled.

Since the curved surface member 130 is in contact with the second surface of the display panel 110, it is possible to provide a stress opposite to the stress applied by the first roller 120.

In addition, the first roller 120 is configured to apply a bending stress to the first surface direction of the display panel 110 and the curved surface member 130 is configured to apply a bending stress to the second surface direction of the display panel 110. That is, the first roller 120 and the curved surface member 130 are configured to apply stress in directions opposite to each other while having a curvature radius equal to or larger than a threshold curvature radius RTH of the display panel 110.

The curved surface member 130 may have various shapes. The area of the curved surface member 130 that is in contact with the display panel 110 is configured such that the second curvature radius R2 has a value equal to or larger than a threshold curvature radius RTH of the display panel 110. That is, the shape of the curved surface member 130 not in contact with the display panel 110 may not be limited.

For example, when the threshold curvature radius RTH of the display panel 110 is 10R, the first curvature radius R1 of the first roller 120 and the second curvature radius R2 of the curved surface member 130 have a value of 10R or more.

For example, when the threshold curvature radius RTH of the display panel 110 is 5R, the first curvature radius R1 of the first roller 120 and the second curvature radius R2 of the curved surface member 130 have a value of 5R or more.

A rollable display apparatus 100 according to an embodiment of the present disclosure may include a display panel 110 having a threshold curvature radius RTH, a first roller 120 having a first curvature radius R1 equal to or larger than the threshold curvature radius RTH and attached to one side of the display panel 110 so that the display panel 110 is configured to be rolled-up, and a curved surface member 130, spaced apart from the first roller 120, having a second curvature radius R2 equal to or larger than the threshold curvature radius RTH in an area in contact with the display panel 110, configured to bend the display panel 110 in a direction opposite to a direction in which the display panel 110 is rolled on the first roller 120.

Accordingly, the rollable display apparatus 100 according to an embodiment of the present disclosure can provide a curved surface member 130, configured to be in contact with the second surface of the display panel 110, configured so that the second curvature radius R2 of the area in contact with the display panel 110 is equal to or larger than the threshold curvature radius RTH. Accordingly, it is possible to provide an effect of restoring the deformation of the display panel 110 by the first roller 120 while preventing the display panel 110 from bending below the threshold curvature radius RTH. Further, there is an effect of reducing the problem of a sustainable stress in one direction to the display panel 110. Further, the flatness characteristic of the display panel 110 can be restrained from deteriorating.

Figure 3:
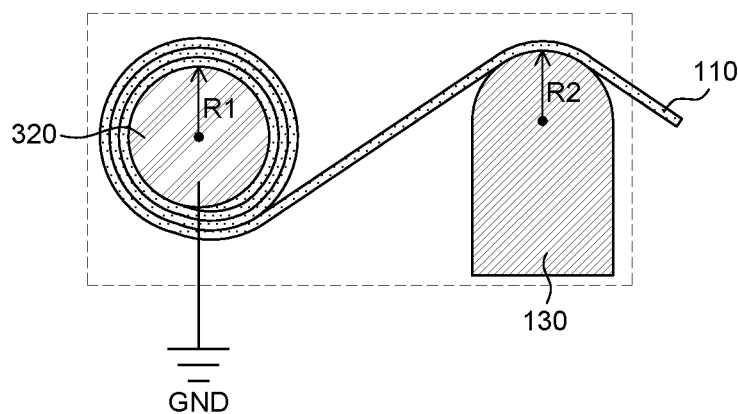
FIG. 3 is a cross-sectional view schematically showing a rollable display apparatus according to another embodiment of the present disclosure.

FIG. 3 is a cross-sectional view schematically showing a rollable display apparatus according to another embodiment of the present disclosure.

In describing the rollable display apparatus 300 according to another embodiment of the present disclosure, redundant features of the rollable display apparatus 100 according to an embodiment of the present disclosure may be omitted for convenience of explanation.

Referring to FIG. 3, the rollable display apparatus 300 according to another embodiment of the present disclosure may be configured to include at least a display panel 110, a first roller 320, and a curved surface member 130.

The display panel 110 and the curved surface member 130 of the rollable display apparatus 300 according to another embodiment of the present disclosure are substantially similar to the display panel 110 and the curved surface member 130 of the rollable display apparatus 100 according to an embodiment of the present disclosure. Thus, redundant description may be omitted.

The first roller 320 according to another embodiment of the present disclosure is electrically grounded GND.

As the display panel 110 is repeatedly rolled and unrolled, friction may occur. The friction can be generated by the first roller 320 and the curved surface member 130 and can be generated by winding of the display panel 110 itself.

If static electricity is generated by the friction, foreign matter may stick to the first surface or the second surface of the display panel 110.

A rollable display apparatus 300 according to another embodiment of the present disclosure may include a display panel 110 having a threshold curvature radius RTH, a first roller 320 having a first curvature radius R1 equal to or larger than the threshold curvature radius RTH, attached to one side of the display panel 110 so that the display panel 110 is configured to be rolled-up, and electrically grounded; and a curved surface member 130, spaced apart from the first roller 320, having a second curvature radius R2 equal to or larger than the threshold curvature radius RTH in an area in contact with the display panel 110, configured to bend the display panel 110 in a direction opposite to a direction in which the display panel 110 is rolled on the first roller 320.

Accordingly, the rollable display apparatus 300 according to another embodiment of the present disclosure has an effect of discharging the static electricity that may be generated by the display panel 110 by electrically grounding the first roller 320 in which the display panel is rolled-up. Accordingly, there is an effect that the foreign matter which may adhere to the display panel 110 due to the static electricity can be reduced. Thus, possible damage of the display panel 110 can be reduced.

Figure 4:
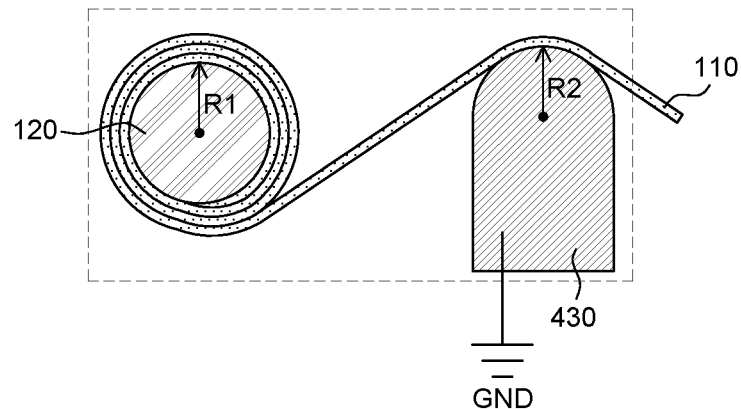
FIG. 4 is a cross-sectional view schematically showing a rollable display apparatus according to another embodiment of the present disclosure.

FIG. 4 is a cross-sectional view schematically showing a rollable display apparatus according to the other embodiment of the present disclosure.

In describing the rollable display apparatus 400 according to the other embodiment of the present disclosure, redundant features of the rollable display apparatus 100 according to an embodiment of the present disclosure may be omitted for convenience of explanation.

Referring to FIG. 4, the rollable display apparatus 400 according to the other embodiment of the present disclosure may be configured to include at least a display panel 110, a first roller 120, and a curved surface member 430.

The display panel 110 and the first roller 120 of the rollable display apparatus 400 according to the other embodiment of the present disclosure are substantially similar to the display panel 110 and the first roller 120 of the rollable display apparatus 100 according to an embodiment of the present disclosure. Thus, redundant description may be omitted.

The curved surface member 430 according to the other embodiment of the present disclosure is electrically grounded GND.

As the display panel 110 is repeatedly rolled and unrolled, friction may occur. The friction can be generated by the first roller 120 and the curved surface member 430 and can be generated by winding of the display panel 110 itself.

If static electricity is generated by the friction, the foreign matter may stick to the first surface or the second surface of the display panel 110.

A rollable display apparatus 400 according to the other embodiment of the present disclosure may include a display panel 110 having a threshold curvature radius RTH, a first roller 120, having a first curvature radius R1 equal to or larger than the threshold curvature radius RTH, attached to one side of the display panel 110 so that the display panel 110 is configured to be rolled-up, and a curved surface member 430, spaced apart from the first roller 120, having a second curvature radius R2 equal to or larger than the threshold curvature radius RTH in an area in contact with the display panel 110, configured to bend the display panel 110 in a direction opposite to a direction in which the display panel 110 is rolled on the first roller 120, and electrically grounded.

Accordingly, the rollable display apparatus 400 according to the other embodiment of the present disclosure has an effect of discharging the static electricity that may be generated by the display panel 110 by electrically grounding the curved surface member 430 in contact with the display panel 110. Accordingly, there is an effect that the foreign matter which may adhere to the display panel 110 due to the static electricity can be reduced. Thus, possible damage of the display panel 110 can be reduced.

Figure 5:
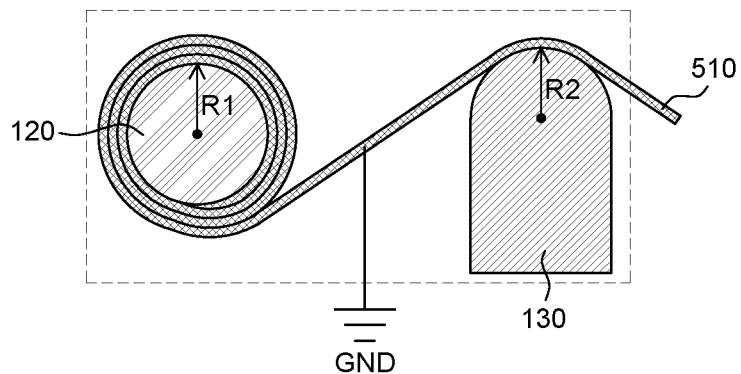
FIG. 5 is a cross-sectional view schematically showing a rollable display apparatus according to another embodiment of the present disclosure.

FIG. 5 is a cross-sectional view schematically showing a rollable display apparatus according to the other embodiment of the present disclosure.

In describing the rollable display apparatus 500 according to the other embodiment of the present disclosure, redundant features of the rollable display apparatus 100 according to an embodiment of the present disclosure may be omitted for convenience of explanation.

Referring to FIG. 5, the rollable display apparatus 500 according to the other embodiment of the present disclosure may be configured to include at least a display panel 510, a first roller 120, and a curved surface member 130.

The first roller 120 and the curved surface member 130 of the rollable display apparatus 500 according to the other embodiment of the present disclosure are substantially similar to the first roller 120 and the curved surface member 130 of the rollable display apparatus 100 according to an embodiment of the present disclosure. Thus, redundant description may be omitted.

The display panel 510 according to the other embodiment of the present disclosure is electrically grounded GND.

As the display panel 510 is repeatedly rolled and unrolled, friction may occur. The friction can be generated by the first roller 120 and the curved surface member 130 and can be generated by winding of the display panel 510 itself.

If static electricity is generated by the friction, the foreign matter may stick to the first surface or the second surface of the display panel 510.

A rollable display apparatus 500 according to the other embodiment of the present disclosure may include a display panel 510, which is electrically grounded, having a threshold curvature radius RTH, a first roller 120, having a first curvature radius R1 equal to or larger than the threshold curvature radius RTH, attached to one side of the display panel 510 so that the display panel 510 is configured to be rolled-up, and a curved surface member 130, spaced apart from the first roller 120, having a second curvature radius R2 equal to or larger than the threshold curvature radius RTH in an area in contact with the display panel 510, configured to bend the display panel 510 in a direction opposite to a direction in which the display panel 510 is rolled on the first roller 120.

Accordingly, the rollable display apparatus 500 according to the other embodiment of the present disclosure has an effect of discharging the static electricity that may be generated by the display panel 510 by electrically grounding the display panel 510. Accordingly, there is an effect that the foreign matter which may adhere to the display panel 510 due to the static electricity can be reduced. Thus, possible damage of the display panel 510 can be reduced.

In some embodiments, the rollable display apparatus may be configured to include an electrically grounded first roller and an electrically grounded curved surface member. Therefore, the static electricity that can be generated on the display panel can be discharged more efficiently.

Figure 6:
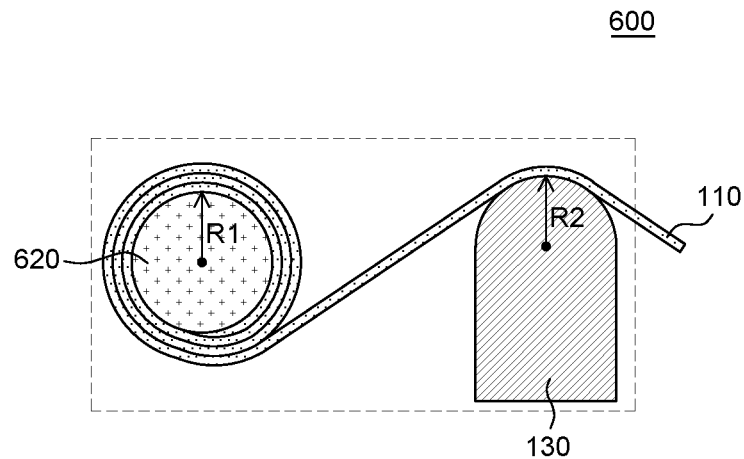
FIG. 6 is a cross-sectional view schematically showing a rollable display apparatus according to another embodiment of the present disclosure.

FIG. 6 is a cross-sectional view schematically showing a rollable display apparatus according to the other embodiment of the present disclosure.

In describing the rollable display apparatus 600 according to the other embodiment of the present disclosure, redundant features of the rollable display apparatus 100 according to an embodiment of the present disclosure may be omitted for convenience of explanation.

Referring to FIG. 6, the rollable display apparatus 600 according to the other embodiment of the present disclosure may be configured to include at least a display panel 110, a first roller 620, and a curved surface member 130.

The display panel 110 and the curved surface member 130 of the rollable display apparatus 600 according to the other embodiment of the present disclosure are substantially similar to the display panel 110 and the curved surface member 130 of the rollable display apparatus 100 according to an embodiment of the present disclosure. Thus, redundant description may be omitted.

The surface of the first roller 620 according to the other embodiment of the present disclosure is configured to have a sheet resistance capable of reducing the generation of static electricity.

As the display panel 110 is repeatedly rolled and unrolled, friction may occur with the first roller 620. When static electricity is generated by the friction, the foreign matter may stick to the first surface or the second surface of the display panel 110 or the first roller 620.

When the sheet resistance of the surface of the first roller 620 is 1012 $\Omega$/sq or less, static electricity that may be generated by friction between the first roller 620 and the display panel 110 can be reduced.

For example, the surface of the first roller 620 may be configured to include at least one among a conductive carbon material, a nanometal, and a conductive polymer. When the above-mentioned material is included, it is possible to make the sheet resistance of the surface of the first roller 620 to be 1012 $\Omega$/sq or less.

For example, the surface of the first roller 620 may be treated to include a nanometal. However, the present disclosure is not limited thereto, and the first roller 620 may be formed of a nanometal. The nanometal may comprise at least one among indium-tin-oxide (ITO), antimony-tin-oxide (ATO), and silver (Ag). But the present disclosure is not limited thereto. When the above-mentioned material is included, it is possible to make the sheet resistance of the surface of the first roller 620 to be 1012 $\Omega$/sq or less.

For example, the surface of the first roller 620 may be treated to include a conductive polymer, but the present disclosure is not limited thereto, and the first roller 620 may be formed of a conductive polymer. The conductive polymer may include at least one among polyaniline, polypyrrole, and polythiophene. However, the present disclosure is not limited thereto. When the above-mentioned material is included, it is possible to make the sheet resistance of the surface of the first roller 620 to be 1012 $\Omega$/sq or less.

For example, the surface of the first roller 620 may be treated to include a conductive carbon material, but the present disclosure is not so limited, and the first roller 620 may be formed of a conductive carbon material. When the above-mentioned material is included, it is possible to make the sheet resistance of the surface of the first roller 620 to 1012 $\Omega$/sq or less.

A rollable display apparatus 600 according to the other embodiment of the present disclosure may include a display panel 110 having a threshold curvature radius RTH, a first roller 620, having a first curvature radius R1 equal to or larger than the threshold curvature radius RTH, attached to one side of the display panel 110 so that the display panel 110 is configured to be rolled-up, and having a sheet resistance value equal to or less than a specific value of a surface thereof, and a curved surface member 130, spaced apart from the first roller 620, having a second curvature radius R2 equal to or larger than the threshold curvature radius RTH in an area in contact with the display panel 110, configured to bend the display panel 110 in a direction opposite to a direction in which the display panel 110 is rolled on the first roller 620.

Accordingly, the rollable display apparatus 600 according to the other embodiment of the present disclosure has an effect of reducing the static electricity that may be generated by the display panel 110 by reducing the sheet resistance of the surface of the first roller 620. Accordingly, there is an effect that the foreign matter which may adhere to the display panel 110 due to the static electricity can be reduced. Thus, possible damage of the display panel 110 can be reduced.

In some embodiments, the rollable display apparatus can be configured such that the first roller configured to reduce static electricity can be electrically grounded. Therefore, the generation of static electricity at the display panel can be reduced, and the generated static electricity can be discharged.

Figure 7:
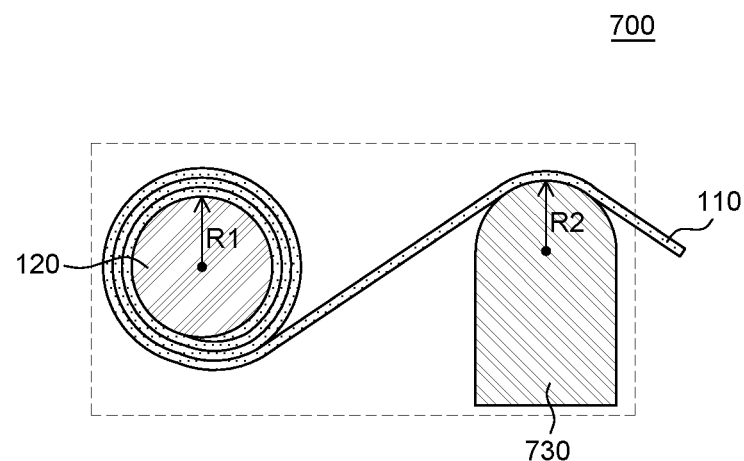
FIG. 7 is a cross-sectional view schematically showing a rollable display apparatus according to another embodiment of the present disclosure.

FIG. 7 is a cross-sectional view schematically showing a rollable display apparatus according to the other embodiment of the present disclosure.

In describing the rollable display apparatus 700 according to the other embodiment of the present disclosure, redundant features of the rollable display apparatus 100 according to an embodiment of the present disclosure may be omitted for convenience of explanation.

Referring to FIG. 7, the rollable display apparatus 700 according to the other embodiment of the present disclosure may be configured to include at least a display panel 110, a first roller 120, and a curved surface member 730.

The display panel 110 and the first roller 120 of the rollable display apparatus 700 according to the other embodiment of the present disclosure are substantially similar to the display panel 110 and the first roller 120 of the rollable display apparatus 100 according to an embodiment of the present disclosure. Thus, redundant description may be omitted.

The surface of the curved surface member 730 according to the other embodiment of the present disclosure is configured to have a sheet resistance capable of reducing the generation of static electricity.

As the display panel 110 is repeatedly rolled and unrolled, friction may occur with the curved surface member 730. When static electricity is generated by the friction, the foreign matter may stick to the first surface or the second surface of the display panel 110 or the curved surface member 730.

When the sheet resistance of the surface of the curved surface member 730 is 1012 Ω/sq or less, static electricity that may be generated by friction between the curved surface member 730 and the display panel 110 can be reduced.

For example, the surface of the curved surface member 730 may be configured to include at least one among a conductive carbon material, a nanometal, and a conductive polymer. When the above-mentioned material is included, it is possible to make the sheet resistance of the surface of the curved surface member 730 to be 1012 Ω/sq or less.

For example, the surface of the curved surface member 730 may be treated to include a nanometal. However, the present disclosure is not limited thereto, and the curved surface member 730 may be formed of a nanometal. The nanometal may comprise at least one among indium-tin-oxide (ITO), antimony-tin-oxide (ATO), and silver (Ag). But the present disclosure is not limited thereto. When the above-mentioned material is included, it is possible to make the sheet resistance of the surface of the curved surface member 730 to be 1012 Ω/sq or less.

For example, the surface of the curved surface member 730 may be treated to include a conductive polymer, but the present disclosure is not limited thereto, and the curved surface member 730 may be formed of a conductive polymer. The conductive polymer may include at least one among polyaniline, polypyrrole, and polythiophene. However, the present disclosure is not limited thereto. When the above-mentioned material is included, it is possible to make the sheet resistance of the surface of the curved surface member 730 to be 1012 Ω/sq or less.

For example, the surface of the curved surface member 730 may be treated to include a conductive carbon material, but the present disclosure is not so limited, and the curved surface member 730 may be formed of a conductive carbon material. When the above-mentioned material is included, it is possible to make the sheet resistance of the surface of the curved surface member 730 to 1012 Ω/sq or less.

A rollable display apparatus 700 according to the other embodiment of the present disclosure may include a display panel 110 having a threshold curvature radius RTH, a first roller 120, having a first curvature radius R1 equal to or larger than the threshold curvature radius RTH, attached to one side of the display panel 110 so that the display panel 110 is configured to be rolled-up, and a curved surface member 730, spaced apart from the first roller 120, having a second curvature radius R2 equal to or larger than the threshold curvature radius RTH in an area in contact with the display panel 110, configured to bend the display panel 110 in a direction opposite to a direction in which the display panel 110 is rolled on the first roller 120, and having a sheet resistance value equal to or less than a specific value of a surface thereof.

Accordingly, the rollable display apparatus 700 according to the other embodiment of the present disclosure has an effect of reducing the static electricity that may be generated by the display panel 110 by reducing the sheet resistance of the surface of the curved surface member 730. Accordingly, there is an effect that the foreign matter which may adhere to the display panel 110 due to the static electricity can be reduced. Thus, possible damage of the display panel 110 can be reduced.

In addition, the curved surface member 730 bends the display panel 110 in the opposite direction in order to relieve the stress applied to the display panel 110 along the winding direction of the first roller 120. The friction generated by the contact between the curved surface member 730 and the display panel 110 may be relatively greater than the friction generated by the contact between the first roller 120 and the display panel 110. Therefore, when the friction of the curved surface member 730 is reduced, the effect of reducing the static electricity can be further improved.

In some embodiments, the rollable display apparatus may be configured such that the curved surface member configured to reduce static electricity is electrically grounded. Therefore, the generation of static electricity that can be generated in the display panel can be reduced, and the generated static electricity can be discharged.

Figure 8:
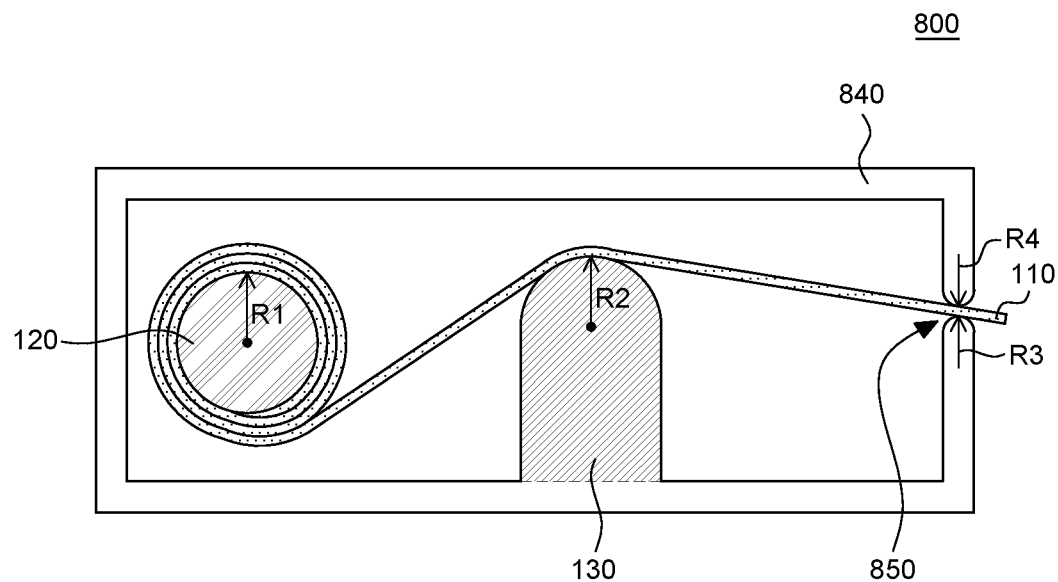
FIG. 8 is a cross-sectional view schematically showing a rollable display apparatus according to another embodiment of the present disclosure.

FIG. 8 is a cross-sectional view schematically showing a rollable display apparatus according to the other embodiment of the present disclosure.

In describing the rollable display apparatus 800 according to the other embodiment of the present disclosure, redundant features of the rollable display apparatus 100 according to an embodiment of the present disclosure may be omitted for convenience of explanation.

Referring to FIG. 8, the rollable display apparatus 800 according to the other embodiment of the present disclosure may be configured to include at least a display panel 110, a first roller 120, a curved surface member 130 and a housing 840.

The display panel 110, the first roller 120, and the curved surface member 130 of the rollable display apparatus 800 according to the other embodiment of the present disclosure may be substantially similar to the display panel 110, the first roller 120, and the curved surface member 130 of the rollable display apparatus 100 according to an embodiment of the present disclosure. Thus, redundant description may be omitted.

The housing 840 is configured to contain the display panel 110 and the curved surface member 130. Although housing 840 is illustratively shown as one component, it is only for convenience of illustration. Thus, the housing 840 can be made of at least one component, and a plurality of components may be fastened and secured to housing 840.

The rotation axis of the first roller 120 may be fixed to the housing 840. But the present disclosure is not limited thereto. The curved surface member 130 may be fastened to the housing 840 or may protrude from the housing 840. But the present disclosure is not limited thereto.

The housing 840 may be configured to include an opening 850 configured to expose the display panel 110 out of the housing 840.

The opening 850 may be in the form of a slit. But the present disclosure is not limited thereto. The lower side of the opening 850 is configured to have a third curvature radius R3 and the upper side of the opening 850 is configured to have a fourth curvature radius R4.

The curvature radii R3 and R4 of the regions of the opening 850 that may be in contact with the display panel 110 are configured to have a value equal to or larger than a threshold curvature radius RTH of the display panel 110. That is, the shape of the opening 850 that does not contact the display panel 110 may not be limited to the threshold curvature radius RTH.

In other words, when the edges of the opening 850 are at right angles and if a user pulls out the display panel 110 upward or downward, the display panel 110 may be damaged by sharp edges.

A rollable display apparatus 800 according to the other embodiment of the present disclosure may include a display panel 110 having a threshold curvature radius RTH, a first roller 120, having a first curvature radius R1 equal to or larger than the threshold curvature radius RTH, attached to one side of the display panel 110 so that the display panel 110 is configured to be rolled-up, a curved surface member 130, spaced apart from the first roller 120, having a second curvature radius R2 equal to or larger than the threshold curvature radius RTH in an area in contact with the display panel 110, configured to bend the display panel 110 in a direction opposite to a direction in which the display panel 110 is rolled on the first roller 120, and a housing 840 including an opening 850 having curvature radii R3 and R4 equal to or larger than the threshold curvature radius RTH.

The third curvature radius R3 is configured to have a value equal to or larger than a threshold curvature radius RTH of the display panel 110. According to said configuration, even if the display panel 110 is in contact with the housing 840 having the third curvature radius R3, the display panel 110 can be curled up to or larger than the threshold curvature radius RTH of the display panel 110. Thus, the stress applied to the display panel 110 can be reduced. Accordingly, there is an effect that since the stress below the threshold level is applied to the display panel 110, even if the display panel 110 contacts the opening 850 having the third curvature radius R3, likelihood of damage to the display panel 110 can be reduced.

The fourth curvature radius R4 is configured to have a value equal to or larger than a threshold curvature radius RTH of the display panel 110. According to said configuration, even if the display panel 110 is in contact with the housing 840 having the fourth curvature radius R4, the display panel 110 can be curled up to or larger than the threshold curvature radius RTH of the display panel 110. Thus, the stress applied to the display panel 110 can be reduced. Accordingly, there is an effect that since the stress below the threshold level is applied to the display panel 110, even if the display panel 110 contacts the opening 850 having the fourth curvature radius R4, likelihood of damage to the display panel 110 can be reduced.

Figure 9:
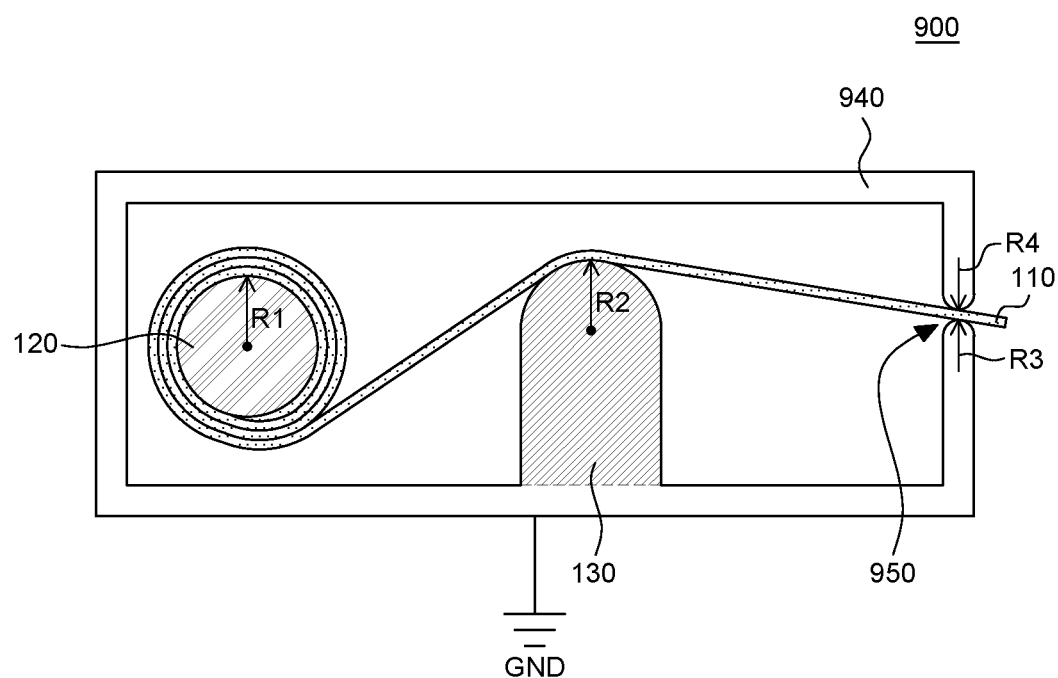
FIG. 9 is a cross-sectional view schematically showing a rollable display apparatus according to another embodiment of the present disclosure.

FIG. 9 is a cross-sectional view schematically showing a rollable display apparatus according to the other embodiment of the present disclosure.

In describing the rollable display apparatus 900 according to the other embodiment of the present disclosure, redundant features of the rollable display apparatus 100 according to an embodiment of the present disclosure may be omitted for convenience of explanation.

Referring to FIG. 9, the rollable display apparatus 900 according to the other embodiment of the present disclosure may be configured to include at least a display panel 110, a first roller 120, a curved surface member 130 and a housing 940.

The display panel 110, the first roller 120, and the curved surface member 130 of the rollable display apparatus 900 according to the other embodiment of the present disclosure may be substantially similar to the display panel 110, the first roller 120, and the curved surface member 130 of the rollable display apparatus 100 according to an embodiment of the present disclosure. Thus, redundant description may be omitted.

A rollable display apparatus 900 according to the other embodiment of the present disclosure may include a display panel 110 having a threshold curvature radius RTH, a first roller 120, having a first curvature radius R1 equal to or larger than the threshold curvature radius RTH, attached to one side of the display panel 110 so that the display panel 110 is configured to be rolled-up, a curved surface member 130, spaced apart from the first roller 120, having a second curvature radius R2 equal to or larger than the threshold curvature radius RTH in an area in contact with the display panel 110, configured to bend the display panel 110 in a direction opposite to a direction in which the display panel 110 is rolled on the first roller 120, and a housing 940 including an opening 950 having curvature radii R3 and R4 equal to or larger than the threshold curvature radius RTH.

The third curvature radius R3 is configured to have a value equal to or larger than a threshold curvature radius RTH of the display panel 110. According to said configuration, even if the display panel 110 is in contact with the housing 940 having the third curvature radius R3, the display panel 110 can be curled up to or larger than the threshold curvature radius RTH of the display panel 110. Thus, the stress applied to the display panel 110 can be reduced. Accordingly, there is an effect that since the stress below the threshold level is applied to the display panel 110, even if the display panel 110 contacts the opening 950 having the third curvature radius R3, likelihood of damage to the display panel 110 can be reduced.

The fourth curvature radius R4 is configured to have a value equal to or larger than a threshold curvature radius RTH of the display panel 110. According to said configuration, even if the display panel 110 is in contact with the housing 940 having the fourth curvature radius R4, the display panel 110 can be curled up to or larger than the threshold curvature radius RTH of the display panel 110. Thus, the stress applied to the display panel 110 can be reduced. Accordingly, there is an effect that since the stress below the threshold level is applied to the display panel 110, even if the display panel 110 contacts the opening 950 having the fourth curvature radius R4, likelihood of damage to the display panel 110 can be reduced.

The housing 940 of the rollable display apparatus 900 according to the other embodiment of the present disclosure may be configured to be electrically grounded. Therefore, the generation of static electricity that can be generated in the display panel 110 can be reduced, and the generated static electricity can be discharged.

A rollable display apparatus 900 according to the other embodiment of the present disclosure may be configured to include a display panel 110 having a threshold curvature radius RTH, a first roller 120, having a first curvature radius R1 equal to or larger than the threshold curvature radius RTH, attached to one side of the display panel 110 so that the display panel 110 is configured to be rolled-up, a curved surface member 130, spaced apart from the first roller 120, having a second curvature radius R2 equal to or larger than the threshold curvature radius RTH in an area in contact with the display panel 110, configured to bend the display panel 110 in a direction opposite to a direction in which the display panel 110 is rolled on the first roller 120, and a housing 940 including an opening 950 having curvature radii R3 and R4 equal to or larger than the threshold curvature radius RTH.

The opening 950 of the housing 940 in contact with the display panel 110 may be configured to have curvature radii R3 and R4 more than the threshold curvature radius RTH, so that likelihood of damage to the display panel 110 can be reduced.

In some embodiments, the housing and the first roller may be configured to be electrically connected to each other. According to the above-described configuration, since the housing is grounded, there is an effect that the first roller can be grounded.

In some embodiments, the housing and the curved surface member may be configured to be electrically connected to each other. According to the above-described configuration, since the housing is grounded, the curved surface member can be grounded.

In some embodiments, the housing, the first roller, and the curved surface member may be configured to be electrically connected to each other. According to the above-described configuration, since the housing is grounded, there is an effect that the first roller and the curved surface member can be grounded.

In some embodiments, the surface of the housing configured to contact the display panel may be configured to have a sheet resistance that can reduce the generation of static electricity. For example, the sheet resistance of the surface of the housing on which the display panel contacts can be 1012 Ω/sq or less. For example, the surface of the housing in contact with the display panel may be configured to include at least one among a conductive carbon material, a nanometal, and a conductive polymer. For example, the surface of the housing in contact with the display panel can be treated to include the nanometal. However, the present disclosure is not limited thereto, and the housing may be formed of a nanometal. For example, the surface of the housing to which the display panel contacts can be treated to include the conductive polymer, but the present disclosure is not limited thereto, and the housing may be formed of a conductive polymer. For example, the surface of the housing may be treated to include a conductive carbon material, but the present disclosure is not limited thereto, and the housing may be formed of a conductive carbon material.

Figure 10:
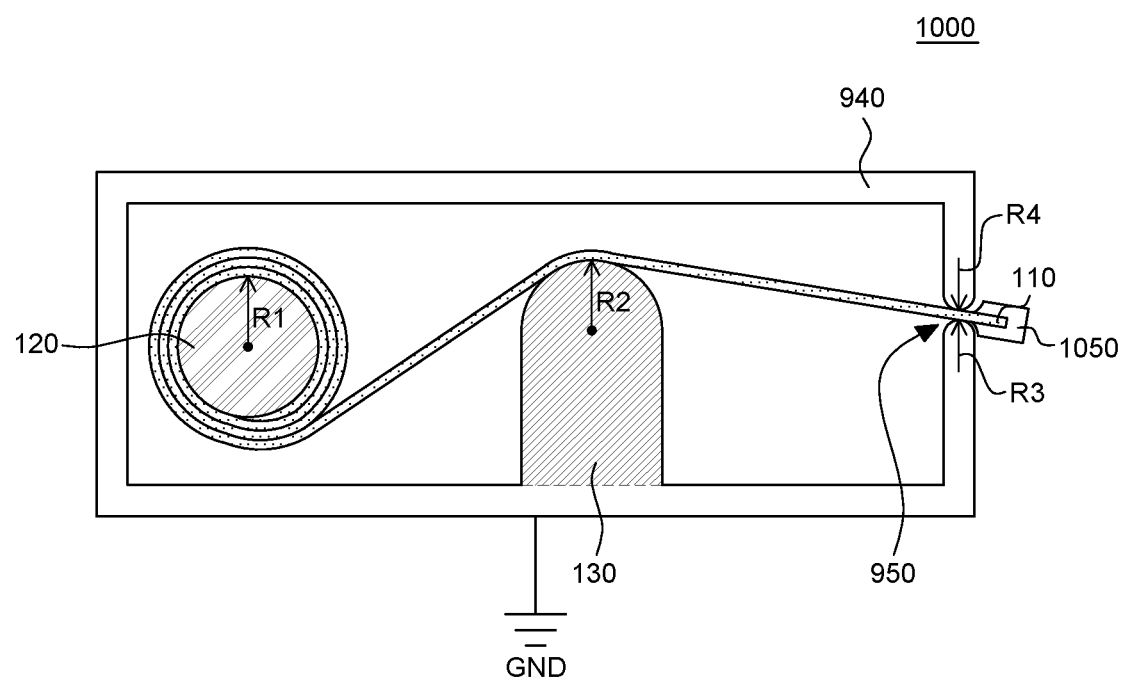
FIG. 10 is a cross-sectional view schematically showing a rollable display apparatus according to another embodiment of the present disclosure.

FIG. 10 is a cross-sectional view schematically showing a rollable display apparatus according to the other embodiment of the present disclosure.

In describing the rollable display apparatus 1000 according to the other embodiment of the present disclosure, redundant features of the rollable display apparatus 900 according to the other embodiment of the present disclosure may be omitted for convenience of explanation.

Referring to FIG. 10, the rollable display apparatus 1000 according to the other embodiment of the present disclosure may be configured to include at least a display panel 110, a first roller 120, a curved surface member 130, a housing 940 and a handle 1050.

The display panel 110, the first roller 120, the curved surface member 130, and a housing 940 of the rollable display apparatus 1000 according to the other embodiment of the present disclosure may be substantially similar to the display panel 110, the first roller 120, the curved surface member 130, and the housing 940 of the rollable display apparatus 900 according to the other embodiment of the present disclosure. Thus, redundant description may be omitted.

The handle 1050 is further included at the other end of the display panel 110 of the rollable display apparatus 1000 according to the other embodiment of the present disclosure.

The handle 1050 can be configured to have a size and thickness suitable for the user to hold by hand. But the present disclosure is not limited thereto.

The handle 1050 is configured to have a shape corresponding to the third and fourth curvature radii R3 and R4 of the housing 940. If the handle 1050 is configured to have a shape corresponding to the curvature radii R3 and R4 of the opening 950 of the housing 940, then there is an effect that the handle 1050 can be stably placed in the opening 950 of the housing 940 when the display panel 110 is housed in the housing 940.

If the shape of the handle 1050 adjacent to the opening 950 does not correspond to the opening 950, such as the shape of the handle 1050 is a rectangle or other shape, even if the display panel 110 is rolled-up, a separation may occur in the engagement area between the handle 1050 and the opening 950. Accordingly, unnecessary stress can be applied to the other end of the display panel 110, so that the display panel 110 may be damaged.

The rollable display apparatus 1000 according to the other embodiment of the present disclosure can provide a handle 1050 corresponding to the curvature radii R3 and R4 of the opening 950 of the housing 940. Thus, there is an effect that damage that may occur in the other end of the display panel 110 can be reduced when the display panel 110 is housed in the housing 940.

In some embodiments, the other end of the display panel of the rollable display apparatus may further include a handle configured to have a radius of curvature corresponding to the radius of curvature of the opening of the housing.

In some embodiments, the other end of the display panel of the rollable display apparatus may be further provided with a handle configured to have a radius of curvature corresponding to the radius of curvature of the opening of the housing and to have a sheet resistance that can reduce the generation of static electricity.

Figure 11:
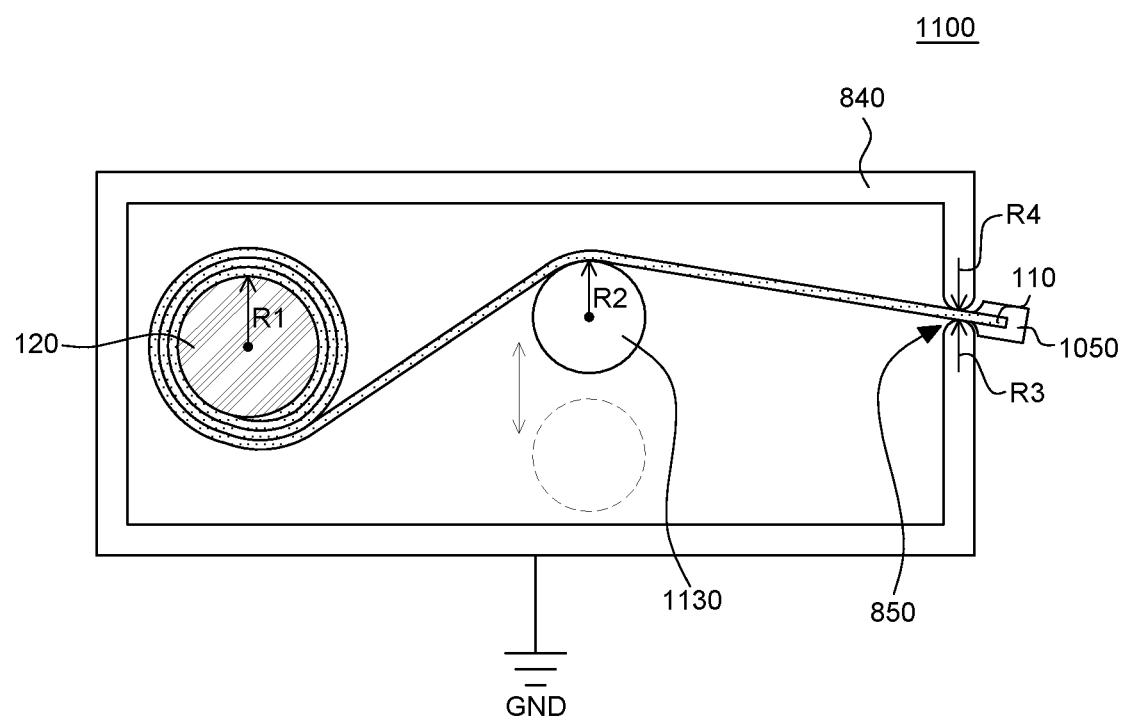
FIG. 11 is a cross-sectional view schematically showing a rollable display apparatus according to another embodiment of the present disclosure.

FIG. 11 is a cross-sectional view schematically showing a rollable display apparatus according to the other embodiment of the present disclosure.

In describing the rollable display apparatus 1100 according to the other embodiment of the present disclosure, redundant features of the rollable display apparatus 800 according to the other embodiment of the present disclosure may be omitted for convenience of explanation.

Referring to FIG. 11, the rollable display apparatus 1100 according to the other embodiment of the present disclosure may be configured to include at least a display panel 110, a first roller 120, a second roller 1130, a housing 840 and a handle 1050.

The display panel 110, the first roller 120, and a housing 840 of the rollable display apparatus 1100 according to the other embodiment of the present disclosure may be substantially similar to the display panel 110, the first roller 120, and the housing 840 of the rollable display apparatus 800 according to the other embodiment of the present disclosure. Thus, redundant description may be omitted.

The handle 1050 of the rollable display apparatus 1100 according to the other embodiment of the present disclosure may be substantially similar to the handle 1050 of the rollable display apparatus 1000 according to the other embodiment of the present disclosure. Thus, redundant description may be omitted.

The second roller 1130 of the rollable display apparatus 1100 according to the other embodiment of the present disclosure is configured to contact the second surface which is the opposite surface of the first surface of the display panel 110.

The curvature radius of the second roller 1130, that is, the second curvature radius R2, is configured to have a value equal to or larger than a threshold curvature radius RTH of the display panel 110. According to said configuration, even if the display panel 110 is in contact with the second roller 1130 having the second curvature radius R2, since the display panel 110 is curled above the threshold curvature radius RTH of the display panel 110, there is an effect that the stress applied to the display panel 110 can be reduced. In addition, since the stress below the threshold level is applied to the display panel 110, the likelihood of damage can be reduced even if the display panel 110 is rolled-up.

Since the second roller 1130 contacts the second surface of the display panel 110, it is effective to provide a stress opposite to the stress applied by the first roller 130.

In addition, the first roller 120 is configured to apply a bending stress to the first surface direction of the display panel 110 and the second roller 1130 is configured to apply a bending stress to the second surface direction of the display panel 110. That is, the first roller 120 and the second roller 1130 are configured to apply stress in directions opposite to each other while having a curvature radius equal to or larger than a threshold curvature radius RTH of the display panel 110.

The second roller 1130 can be fixed in a specific position. Referring to FIG. 11, the second roller 1130 is disposed on the upper side, so that the stress caused by the winding of the first roller 120 can be reduced.

The second roller 1130 may be in contact with the display panel 110 or may not be in contact with the display panel 110. That is, the second roller 1130 is configured to move to a predetermined position, and can be configured to apply or not apply the stress to bend the display panel 110 in the direction of the second surface. According to the above-described configuration, there is an effect that the degree of stress relaxation of the first roller 120 can be adjusted according to whether or not the second roller 1130 is in contact.

Figure 12:
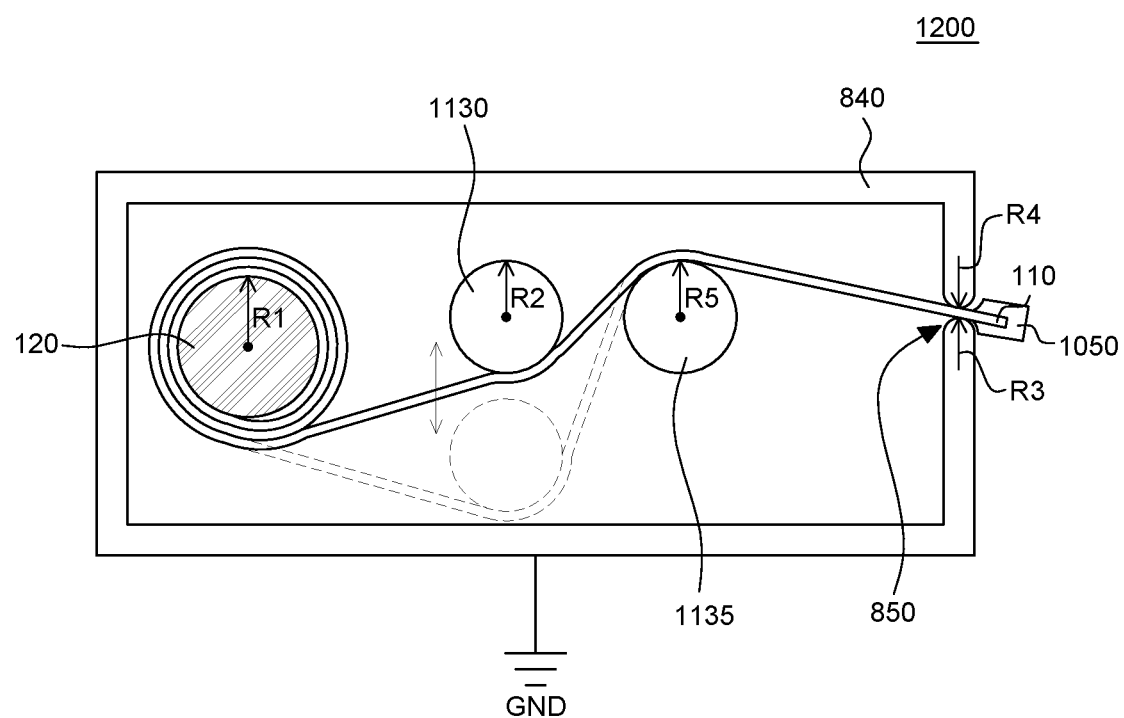
FIG. 12 is a cross-sectional view schematically showing a rollable display apparatus according to another embodiment of the present disclosure.

FIG. 12 is a cross-sectional view schematically showing a rollable display apparatus according to the other embodiment of the present disclosure.

In describing the rollable display apparatus 1200 according to the other embodiment of the present disclosure, redundant features of the rollable display apparatus 1100 according to the other embodiment of the present disclosure may be omitted for convenience of explanation.

Referring to FIG. 12, the rollable display apparatus 1200 according to the other embodiment of the present disclosure may be configured to include at least a display panel 110, a first roller 120, a second roller 1130, a third roller 1135, a housing 840 and a handle 1050.

The display panel 110, the first roller 120, and the housing 840, and the handle 1050 of the rollable display apparatus 1200 according to the other embodiment of the present disclosure may be substantially similar to the display panel 110, the first roller 120, and the housing 840, and the handle 1050 of the rollable display apparatus 1100 according to the other embodiment of the present disclosure. Thus, redundant description may be omitted.

The second roller 1130 of the rollable display apparatus 1200 according to the other embodiment of the present disclosure is configured to contact the first surface which is the same surface of the first surface of the display panel 110.

The curvature radius of the second roller 1130, that is, the second curvature radius R2, is configured to have a value equal to or larger than a threshold curvature radius RTH of the display panel 110. According to said configuration, even if the display panel 110 is in contact with the second roller 1130 having the second curvature radius R2, since the display panel 110 is curled above the threshold curvature radius RTH of the display panel 110, there is an effect that the likelihood of damage of the display panel 110 can be reduced.

The third roller 1135 is configured to contact the second surface which is the opposite surface of the first surface of the display panel 110.

The curvature radius of the third roller 1135, that is, the fifth curvature radius R5, is configured to have a value equal to or larger than a threshold curvature radius RTH of the display panel 110. According to said configuration, even if the display panel 110 is in contact with the third roller 1135 having the fifth curvature radius R5, since the display panel 110 is curled above the threshold curvature radius RTH of the display panel 110, there is an effect that the likelihood of damage of the display panel 110 can be reduced.

Since the third roller 1135 is in contact with the second surface of the display panel 110, it is effective to provide a stress opposite to the stress applied by the first roller 130.

Since the position of the second roller 1130 can be adjusted, the degree of stress applied to the third roller 1135 can be adjusted. Therefore, the tensile force applied to the display panel 110 can be adjusted according to the position of the second roller 1130, and the degree of reducing the stress due to the winding of the first roller 120 can be adjusted.

The second roller 1130 may be in contact with the display panel 110 or may not be in contact with the display panel 110. That is, the second roller 1130 is configured to move to a predetermined position, and can be configured to apply or not apply the stress to bend the display panel 110 in the direction of the second surface. According to the above-described configuration, there is an effect that the degree of stress relaxation of the first roller 120 can be adjusted according to whether or not the second roller 1130 is in contact with the display panel 110.

The exemplary embodiments of the present disclosure can also be described as follows:

According to an aspect of the present disclosure, a rollable display apparatus according to the embodiments of the present disclosure may include a display panel having a threshold curvature radius; a roller, having a curvature radius equal to or larger than the threshold curvature radius, attached to one side of the display panel and configured to allow the display panel to be rolled-up in a first direction; and a curved surface member, spaced apart from the roller, having a curvature radius equal to or larger than the threshold curvature radius in an area in contact with the display panel, configured to bend the display panel in a second direction opposite to the first direction in which the display panel is rolled by the roller. The display panel is configured to be rolled with a curvature equal to or larger than the threshold curvature radius without being damaged.

The roller may be electrically grounded and configured to discharge static electricity of the display panel.

The curved surface member may be electrically grounded and configured to discharge static electricity generated on the display panel.

A surface of at least one of the roller, the curved surface member, and the display panel may have a sheet resistance capable of reducing static electricity.

At least one among the roller, the curved surface member, and the display panel may comprise at least one material among a conductive carbon material, a nanometal, and a conductive polymer.

The sheet resistance at a surface of the display panel may be 1012 Ω/sq or less. The sheet resistance at a surface of the roller may be 1012 Ω/sq or less. The sheet resistance at a surface of the curved surface member may be 1012 Ω/sq or less.

The nanometal may comprise at least one of indium-tin-oxide (ITO), antimony-tin-oxide (ATO), and silver (Ag).

The conductive polymer may comprise at least one material among polyaniline, polypyrrole, and polythiophene.

The rollable display apparatus may include a housing configured to contain the display panel, the roller, and the curved surface member, and the roller may be electrically grounded to the housing.

The rollable display apparatus may include a housing configured to contain the display panel, the roller, and the curved surface member, and the curved surface member may be electrically grounded to the housing.

The rollable display apparatus may include a housing configured to contain the display panel, the roller, and the curved surface member, and the housing may include an opening area allowing the display panel to be exposed outside the housing.

A curvature radius of an edge of the opening area may be equal to or larger than the threshold curvature radius of the display panel.

The rollable display apparatus may include a handle adjacent to the opening area. The handle is connected to an end of the display panel.

The display panel of the rollable display panel may further include a first surface and a second surface opposite to the first surface. The first surface of the display panel is in contact with a surface of the roller. The second surface of the display panel is in contact with a surface of the curved surface member.

According to another aspect of the present disclosure, a rollable display apparatus according to the embodiments of the present disclosure may include a display panel configured to have a threshold curvature radius; a first roller, configured to roll-up the display panel, and having a curvature radius equal to or larger than the threshold curvature radius; and a second roller, configured to restore deformation of the display panel caused by the first roller, and having a curvature radius equal to or larger than the threshold curvature radius. The display panel is configured to be rolled with a curvature equal to or larger than the threshold curvature radius without being damaged.

The rollable display apparatus may include a housing for containing the display panel, the first roller, and the second roller. An opening area of the housing may be configured to have a curvature radius equal to or larger than a threshold curvature radius of the display panel.

A sheet resistance of a surface of at least one of the first roller, the second roller, and the housing may be less than or equal to a specific value so as to reduce a static electricity generated by friction of at least one of the first roller, the second roller, and the housing in contact with the display panel. The display panel may be electrically grounded.

The display panel of the rollable display panel may further include a first surface and a second surface opposite to the first surface. The first surface of the display panel is in contact with a surface of the roller. The second surface of the display panel is in contact with a surface of the curved surface member.

The second roller of the rollable display apparatus may be configured to move between a first position and a second position. The second roller may be configured to be in contact with the display panel when the second roller is in the first position. The second roller may be configured to not be in contact with the display panel when the second roller is in the second position.

According to yet another aspect of the present disclosure, a rollable display apparatus according to the embodiments of the present disclosure may include a first roller designed in consideration of a threshold curvature radius of a display panel and in consideration of deformation according to winding and unwinding operation of the display panel, and a curved surface member designed in consideration of the threshold curvature radius of the display panel and in consideration of deformation according to the winding and unwinding operation of the display panel. The curved surface member may be roller-shaped.

According to yet another aspect of the present disclosure, a rollable display apparatus according to the embodiments of the present disclosure may include a display panel having a threshold curvature radius; a first roller, configured to roll-up the display panel, and having a curvature radius equal to or larger than the threshold curvature radius; a second roller, configured to adjust a tensile force applied to the display panel by the change of the position thereof, the second roller having a curvature radius equal to or larger than the threshold curvature radius; and a third roller, configured to restore deformation of the display panel caused by the first roller, the third roller having a curvature radius equal to or larger than the threshold curvature radius. The display panel is configured to be rolled with a curvature equal to or larger than the threshold curvature radius without being damaged.

The second roller of the rollable display apparatus may be configured to move between a first position and a second position. The second roller may be configured to be in contact with the display panel when the second roller is in the first position. The second roller may be configured to not be in contact with the display panel when the second roller is in the second position.

Some particular elements of the present disclosure that can solve particular problems, for example, damage caused by foreign objects, static electricity, and extra when a display panel is rolled-up can be selectively implemented as needed for to solve particular problems.

The foregoing description is merely illustrative of the present disclosure, and various modifications may be made by those skilled in the art without departing from the technical concept of the present disclosure. Therefore, the embodiments disclosed in the specification of the present disclosure are not intended to limit the present disclosure. Thus, the scope of the present disclosure should be construed according to the following claims, and all the technical ideas within the scope of equivalents should be construed as being included in the scope of the present disclosure.

What is claimed is:

1. A rollable display apparatus including:
   a display panel configured to have a threshold curvature radius, wherein the display panel is configured to be rolled with a curvature equal to or larger than the threshold curvature radius without being damaged;
   a first roller, configured to roll-up the display panel around an entire circumference of the first roller, the first roller having a curvature radius equal to or larger than the threshold curvature radius; and
   a second roller, configured to restore deformation of the display panel caused by the first roller, the second roller having a curvature radius equal to or larger than the threshold curvature radius;
   a third roller, configured to restore deformation of the display panel caused by the first roller, the third roller having a curvature radius equal to or larger than the threshold curvature radius;
   wherein a rotation axis of the second roller is configured to move between a first position and a second position, wherein the second roller is in contact with the display panel when the rotation axis of the second roller is in the first position, and wherein the second roller is not in contact with the display panel when the rotation axis of the second roller is in the second position, wherein a rotation axis of the third roller is configured to be fixed, and wherein the first roller, the second roller and the third roller are disposed in order without an intermediate roller disposed between the first roller and the second roller.

2. The rollable display apparatus of claim 1, further comprising a housing for containing the display panel, the first roller, the second roller, and the third roller, wherein an opening area of the housing is configured to have a curvature radius equal to or larger than a threshold curvature radius of the display panel.

3. The rollable display apparatus of claim 2, wherein the opening area of the housing is closest to the third roller from amongst the first roller, the second roller, and the third roller.

4. The rollable display apparatus of claim 1, wherein a sheet resistance of a surface of at least one of the first roller, the second roller, the third roller, and the housing is less than or equal to 1012 Ω/sq a static electricity generated by friction of at least one of the first roller, the second roller, and the housing in contact with the display panel.

5. The rollable display apparatus of claim 4, wherein the display panel is electrically grounded.

6. The rollable display apparatus of claim 1, wherein the display panel includes a first surface and a second surface opposite to the first surface, wherein the first surface of the display panel is in contact with a surface of the first roller and a surface of the third roller, and the second surface of the display panel is in contact with a surface of the second roller.

* * * * *